(12) United States Patent
Aasheim

(10) Patent No.: US 8,793,686 B2
(45) Date of Patent: Jul. 29, 2014

(54) OPERATING SYSTEM DECOUPLED HETEROGENEOUS COMPUTING

(75) Inventor: Jered Aasheim, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 278 days.

(21) Appl. No.: 13/155,387

(22) Filed: Jun. 8, 2011

(65) Prior Publication Data

US 2012/0317568 A1    Dec. 13, 2012

(51) Int. Cl.
*G06F 9/455* (2006.01)

(52) U.S. Cl.
USPC ............................................................. 718/1

(58) Field of Classification Search
USPC ............................................................. 718/1
See application file for complete search history.

(56) References Cited

U.S. PATENT DOCUMENTS

| | | | |
|---|---|---|---|
| 7,007,183 B2 | 2/2006 | Rawson, III | |
| 7,539,841 B2 | 5/2009 | Rawson, III | |
| 7,647,519 B2 | 1/2010 | Heller et al. | |
| 7,814,307 B2 | 10/2010 | Powell et al. | |
| 2003/0204780 A1 | 10/2003 | Dawkins et al. | |
| 2004/0205773 A1* | 10/2004 | Carcido et al. | 719/318 |
| 2005/0015661 A1 | 1/2005 | Vaidyanathan | |
| 2006/0069938 A1 | 3/2006 | Olszewski et al. | |
| 2008/0028408 A1* | 1/2008 | Day et al. | 718/104 |
| 2009/0037911 A1* | 2/2009 | Ahuja et al. | 718/100 |
| 2009/0055826 A1* | 2/2009 | Bernstein et al. | 718/102 |
| 2010/0115315 A1 | 5/2010 | Davis et al. | |
| 2010/0235598 A1 | 9/2010 | Bouvier | |
| 2010/0306773 A1 | 12/2010 | Lee et al. | |

OTHER PUBLICATIONS

Lefurgy, et al., "Energy Management for Commercial Servers", Retrieved at <<http://ieeexplore.ieee.org/stamp/stamp.jsp?tp=&arnumber=1250880>>, vol. 36, No. 12, Dec. 2003, pp. 39-48.
Hermenier, et al., "Power Management in Grid Computing with Xen", Retrieved at <<http://hal.inria.fr/docs/00/44/13/66/PDF/hermenier.xhpc06.pdf>>, ISPA Workshop on Xen in High-Performance Clusters and Grid Computing Environments, 2006, pp. 10.
Mogul, et al., "Using Asymmetric Single-ISA Cmps to Save Energy on Operating Systems", Retrieved at <<http://people.etf.unsa.ba/~aakagic/articles/04550858.pdf>>, IEEE Micro, vol. 28 No. 3, May-Jun. 2008, pp. 26-41.

(Continued)

*Primary Examiner* — Emerson Puente
*Assistant Examiner* — Steven Do
(74) *Attorney, Agent, or Firm* — Andrew Sanders; Micky Minhas

(57) ABSTRACT

A heterogeneous processing system is described herein that provides a software hypervisor to autonomously control operating system thread scheduling across big and little cores without the operating system's awareness or involvement to improve energy efficiency or meet other processing goals. The system presents a finite set of virtualized compute cores to the operating system to which the system schedules threads for execution. Subsequently, the hypervisor intelligently controls the physical assignment and selection of which core(s) execute each thread to manage energy use or other processing requirements. By using a software hypervisor to abstract the underlying big and little computer architecture, the performance and power operating differences between the cores remain opaque to the operating system. The inherent indirection also decouples the release of hardware with new capabilities from the operating system release schedule.

20 Claims, 4 Drawing Sheets

(56) References Cited

OTHER PUBLICATIONS

Stoess, et al., "Energy Management for Hypervisor-Based Virtual Machines", Retrieved at <<http://www-users.cselabs.umn.edu/classes/Fall-2009/csci8980-virtual/papers/energy_mgmt_vms-usenix07.pdf>>, USENIX Annual Technical Conference, 2007, pp. 1-14.

Fedorova, et al., "Cypress: A Scheduling Infrastructure for a Many-Core Hypervisor", Retrieved at <<http://www.cercs.gatech.edu/mmcs08/program/fedorova.pdf>>, In Proceedings of the Workshop on Managed Multi-Core Systems held in conjunction with the 17th International Symposium on High Performance Distributed Computing, Jun. 24, 2008, pp. 7.

"International Search Report", Mailed Date: Jan. 22, 2013, Application No. PCT/US2012/041434, Filed date: Jun. 7, 2012, pp. 9.

* cited by examiner

OPERATING SYSTEM DECOUPLED HETEROGENEOUS COMPUTING

BACKGROUND

Energy efficiency is increasingly becoming an important differentiator from mobile phones to datacenters. Customers are willing to pay a premium for longer lasting mobile device experiences but also are anxious to get increasing performance from these same devices. On the other end of the scale, datacenters continue to scale up compute power but face thermal limits for what can be efficiently cooled. In addition, the public is increasingly more conscious of energy usage and environmental impact of energy use. Making efficient use of energy is therefore a higher priority design goal in many types of computing systems.

These technically opposing agendas—delivering more performance but using less power—have resulted in the industry experimenting with heterogeneous designs of "big" compute cores closely coupled with "little" compute cores within a single system or silicon chip, called heterogeneous cores or processing herein. The big cores are designed to offer high performance in a larger power envelope while the little cores are designed to offer lower performance in a smaller power envelope. The conventional wisdom is that an operating system's scheduler will then selectively schedule threads on the big or little cores depending upon the workload(s). During at least some times of the day, the operating system may be able to turn off the big core(s) entirely and rely on the power sipping little cores.

Big and little cores may or may not share the same instruction set or features. For example, little cores may include a reduced instruction set or other differences that involve further decision making by the operating system to schedule processes on a compatible core. One traditional example is a system that includes a central processing unit (CPU) and graphics-processing unit (GPU) and allows the GPU to be used for computing tasks when it is idle or underutilized.

Existing and present solutions depend on modifying the operating system's kernel in order to "enlighten" the operating system to the presence of big and little cores, their respective performance and power characteristics, and which facilities in the system (e.g. CPU performance counters, cache miss/hit counters, bus activity counters, and so on) the operating system can monitor for determining on which core(s) to schedule a particular thread. This approach has several drawbacks: 1) it involves modifying the kernel for all supported operating systems, 2) it requires the modified kernel to understand differences in big/little designs across potentially different architectures (e.g., supporting N different implementations), and 3) it tightly couples the release schedule of the operating system kernel and the underlying computer architecture. Changes to the computer architecture then involve waiting for the next scheduled operating system release (i.e., potentially several years or more) before the kernel can support new cores commercially (or vice versa).

SUMMARY

A heterogeneous processing system is described herein that provides a software hypervisor to autonomously control operating system thread scheduling across big and little cores without the operating system's awareness or involvement to improve energy efficiency or meet other processing goals. The system presents a finite set of virtualized compute cores to the operating system to which the system schedules threads for execution. Subsequently, underneath the surface, the hypervisor intelligently controls the physical assignment and selection of which core(s)—big or little—execute each thread to manage energy use or other processing requirements. By using a software hypervisor to abstract the underlying big and little computer architecture, the performance and power operating differences between the cores remain opaque to the operating system. The inherent indirection also decouples the release of hardware with new capabilities from the operating system release schedule. A hardware vendor can release an updated hypervisor, and allow new hardware to work with any operating system version the vendor chooses.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
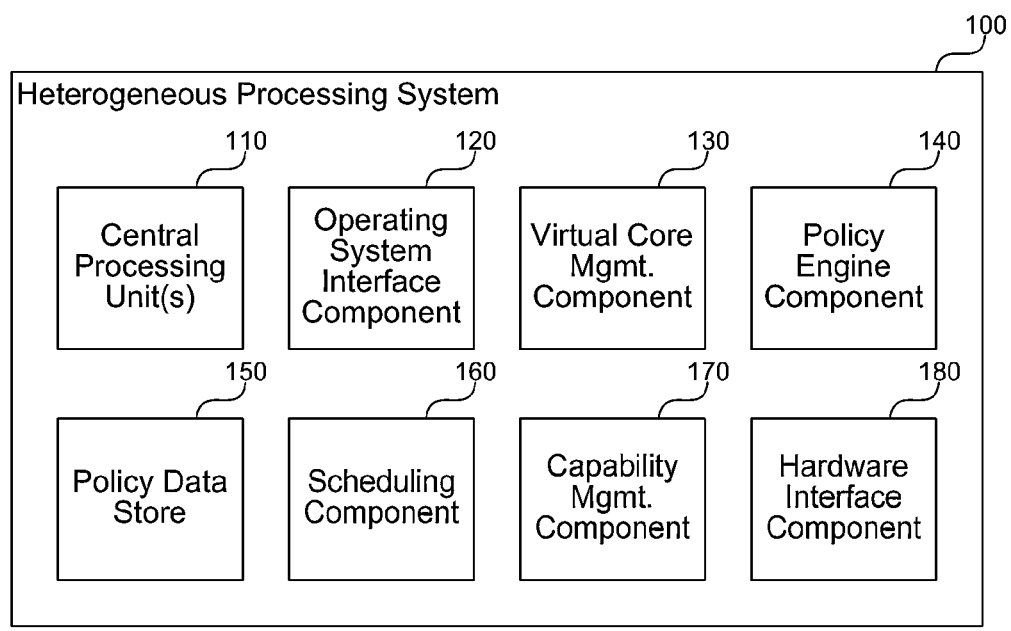
FIG. 1 is a block diagram that illustrates components of the heterogeneous processing system, in one embodiment.

A heterogeneous processing system is described herein that provides a software hypervisor to autonomously control operating system thread scheduling across big and little cores without the operating system's awareness or involvement to improve energy efficiency or meet other processing goals. The system presents a finite set of virtualized compute cores to the operating system to which the system schedules threads for execution. Subsequently, underneath the surface, the hypervisor intelligently controls the physical assignment and selection of which core(s)—big or little—execute each thread to manage energy use or other processing requirements. By using a software hypervisor to abstract the underlying big and little computer architecture, the performance and power operating differences between the cores remain opaque to the operating system. The inherent indirection also decouples the release of hardware with new capabilities from the operating system release schedule. A hardware vendor can release an updated hypervisor, and allow new hardware to work with any operating system version the vendor chooses.

The hypervisor implementation is tightly coupled to the underlying computer architecture and uses the available system feedback (e.g., CPU utilization, bus/cache activity, and so forth) to autonomously assign the appropriate cores for the requested workloads. This approach allows the underlying computer architecture to change frequently in cooperation with the software hypervisor and decouple this evolution from the above operating system(s). The heterogeneous processing system provides simple, course-grained power management without modifying the operating system kernel itself. Thus, the heterogeneous processing system allows for more rapid hardware innovation, and allows existing datacenter and other installations to benefit today from available heterogeneous processing hardware.

Heterogeneous computing is an emerging field within the industry with the goal of optimizing the execution of workloads based on different types of computing cores (e.g., CPUs, GPUs, accelerators, and so on) available in the system. Optimization can be for performance, power, latency, or other goals. The heterogeneous processing system, while applicable to these more general cases, is also targetable at systems with cores that have identical functional equivalence but differing performance/power operating characteristics. Typically, these systems have one or more big cores and one or more little cores. The big cores typically have deep pipelines, out-of-order execution, large caches, high clock speeds, and are manufactured using higher leakage processes (e.g. 40G). The little cores typically have shorter pipelines, smaller caches, lower clock speeds, various power levels, and are manufactured using low leakage processes (e.g. 40LP).

In some embodiments, the big and little cores may have architecture equivalence, micro-architecture equivalence, a global interrupt controller, coherency, and virtualization. Architecture equivalence may include the same Instruction Set Architecture (ISA), Single Instruction Multiple Data (SIMD), Floating Point (FP), co-processor availability, and ISA extensions. Micro-architecture equivalence may include difference in performance but the same configurable features (e.g. cache line length). A global interrupt controller provides the ability to manage, handle, and forward interrupts to all cores. Coherency means all cores can access (cache) data from other cores with forwarding as needed. Virtualization is for switching/migrating workloads from/to cores.

In some embodiments, the heterogeneous processing system may be able to handle minor differences in cores. For example, a little core that does not support Streaming Single Instruction, Multiple Data (SIMD) Extensions (SSE) (now existing in four iterations, SSE1, SSE2, SSE3, and SSE4), may still handle other Intel x86-based software code. The hypervisor may detect unsupported instructions in the instruction stream, and wake up an appropriate core to which to assign such streams. Other instruction streams may operate faithfully on any core. In some cases, such as where only a handful of unsupported instructions are used, the hypervisor may include some level of emulation to emulate the unsupported instructions on the available instruction set. For example, operations such as vector math can often be broken down and implemented at lower efficiency using standard math instructions.

The software hypervisor installs itself during the device boot process prior to operating system (OS) initialization. After completing specified hardware configuration (i.e., configuring memory, initializing the virtualization facilities, and so on), the hypervisor then configures the big and little processing cores installed in the computing device via policy. For example, if the device is a mobile phone, the policy could dictate that the hypervisor start the operating system with a minimal amount of performance available and optimize for battery life; the hypervisor would subsequently schedule operating system threads to one or more little cores. Alternatively, if the device is a datacenter blade, the policy could dictate that the hypervisor start the operating system with the maximal amount of available performance and sacrifice energy efficiency; the hypervisor would subsequently schedule operating system threads to the available big cores—as well as possibly the little cores depending on the available thermal budget. After completing initialization, the software hypervisor loads the operating system boot manager, which then loads the operating system.

During runtime, the heterogeneous processing system presents a virtualized set of cores to the operating system. The operating characteristics and differences between the cores are opaque to the operating system and managed privately by the software hypervisor based upon the defined operating policy. The operating policy may be set during system initialization or dynamically during runtime.

The hypervisor uses the operating policy in conjunction with available system facilities (e.g. CPU performance counters, cache miss/hit counters, bus activity counters, and so on) to determine to which cores to schedule the operating system threads. The hypervisor will use this information to understand CPU core utilization, trends over time, locality of information, and input/output (I/O) patterns. From this information, the hypervisor can dynamically and speculatively migrate the operating system threads across the big and little cores as appropriate. Additionally, the hypervisor may also control dynamic frequency and voltage scaling (DFVS) on behalf of the operating system depending on the system implementation.

Here is a sampling of available operating policies they hypervisor may control: Minimum Power (MiPo), Maximum Performance (MaPe), Minimal Power, Performance on Demand (MiPoD), and Maximum Performance, Power Down on Idle (MaPel). Each of these is described in the following paragraphs. However, additional, more advanced operating policies can be implemented as chosen by any particular implementation.

Minimum Power (MiPo) schedules threads to the minimal set of cores. This typically will mean the hypervisor schedules threads to the little cores and uses DVFS as needed to control the power and performance operating point for the core. Additional little cores can be powered and scheduled as needed.

Maximum Performance (MaPe) schedules threads to the maximal set of cores. This typically will mean the hypervisor schedules threads to all available cores—starting with the big cores—and use DVFS as needed to control the power and performance operating point for the cores. The little cores are also powered and scheduled as much is allowed by the available thermal budget.

Minimal Power, Performance on Demand (MiPoD) normally operates at the lowest available power state (e.g., on one or more little cores) but boosts performance as workloads demand. This is commonly referred to as a "turbo" or "boost" mode of operation and is enabled by dynamically allocating and scheduling to big cores. Once the workload is completed, the system returns to the minimal power state (e.g. on a little core).

Maximum Performance, Power Down on Idle (MaPel) normally operates at the maximal available performance state (e.g. on one or more big cores) but acquiesces to lower power states once an idle threshold is reached. The idle threshold in this case is not the typical near-zero CPU utilization but can be arbitrarily defined at some Dhrystone Million Instructions per Second (DMIPS) or CPU utilization percentage as defined by the policy. When going to idle, the hypervisor dynamically allocates and schedules to little cores and puts the unused big cores into standby/parked states. Policy and/or future workloads determine when the system returns to the maximum available performance state (e.g. on big cores).

FIG. 1 is a block diagram that illustrates components of the heterogeneous processing system, in one embodiment. The system 100 includes one or more central processing units 110, an operating system interface component 120, a virtual core management component 130, a policy engine component 140, a policy data store 150, a scheduling component 160, a capability management component 170, and a hardware interface component 180. Each of these components is described in further detail herein. The following components may be implemented within a software hypervisor that sits between an operating system and hardware resources of a computing device.

The one or more central processing units 110 include one or more processing cores that have heterogeneous processing capabilities and power profiles. Typically, each CPU complex is located on a single silicon die and each core of a CPU complex shares a silicon die. Hardware can be implemented in a variety of packages for a variety of types of devices. For example, newer mobile devices and even some recent desktop processors include a CPU and GPU on the same chip for efficient communication between the two and lower power usage. Each CPU complex may include one or more big and little cores. Alternatively or additionally, one CPU complex may include all big cores while another CPU complex includes all little cores. CPU complexes as used here applies to GPUs and other hardware that can execute software instructions.

The operating system interface component 120 communicates between a hypervisor and an operating system to receive instructions for delivering to hardware resources and for receiving output from the hardware resources. The operating system may schedule threads, provide a pointer to an instruction stream (e.g., a program counter (PC)), write to memory areas that pass instructions to hardware, and so forth. An operating system typically interacts directly with the hardware on a computing device. However, a hypervisor inserts a layer of indirection between the operating system and hardware for a variety of purposes. Often, hypervisors are used to provide virtualization so that multiple operating systems can be run contemporaneously on the same hardware. A hypervisor can also be used to present virtual hardware to the operating system that differs from the actual hardware installed in a computing device. In the case of the heterogeneous processing system 100, this can include making big and little cores appear the same to the operating system. The system 100 may even present a different number of cores to the operating system than actually exist in the device.

The virtual core management component 130 manages one or more virtual cores that the hypervisor presents to the operating system. A virtual core appears to the operating system as a CPU core, but may differ in characteristics from available physical hardware in a computing device. For example, the virtual cores may hide differences in processing or power capabilities from the operating system, so that an operating system not designed to work with heterogeneous big and little cores can operate in a manner for which the operating system was designed. In such cases, the hypervisor provides any specialized programming needed to leverage the heterogeneous computing environment, so that the operating system need not be modified.

The policy engine component 140 manages one or more policies for scheduling operating system threads and presenting virtual cores to the operating system based on the available one or more central processing units. The policy engine component 140 may include hardcoded policies specific to a particular hypervisor implementation or may include administrator-configurable policies that can be modified to suit the particular installation goals. Policies may determine which cores are scheduled first, tradeoffs between power usage and processing goals, how cores are shut off and awoken to save power, how virtual cores are presented to the operating system, and so forth.

The policy data store 150 stores the one or more policies in a storage facility accessible to the hypervisor at boot and execution times. The policy data store 150 may include one or more files, file systems, hard drives, databases, or other storage facilities for persisting data across execution sessions of the system 100. In some embodiments, the administrator performs a setup step that takes the system 100 through a configuration phase to store an initial set of policies for use by the hypervisor.

The scheduling component 160 schedules one or more instruction streams received as threads from the operating system to one or more of the central processing units installed in the computing device. The scheduling component receives a virtual core identification from the operating system that identifies the virtual core to which the operating system requests to schedule the thread. The scheduling component 160 examines the schedule request and determines a physical core on which to schedule the thread to execute. For example, the component 160 may determine if power or processing is more relevant for the thread, and schedule to an appropriate little or big core in response. In some cases, the component 160 may avoid scheduling threads to certain cores to allow those cores to be powered down to save power.

The capability management component 170 optionally manages one or more differences between big and little processing cores. In some cases, the system 100 may only operate on processing units in which the big and little cores share the same capabilities, and the capability management component 170 is not needed. In other cases, the system 100 handles minor or major differences between available processing cores. For example, the system 100 may watch for instructions that are not supported by some cores and schedule the corresponding threads on cores that do support those instructions. In more sophisticated implementations, the component 170 may virtualize or emulate big core capabilities on little cores (or vice versa) to satisfy a power or other profile goal.

The hardware interface component 180 communicates between the hypervisor and central processing units to schedule software instructions to run on available physical cores. The hardware interface component 180 may include real memory addresses or other facilities for accessing real hardware that are hidden from other components and in particular from the guest operating system(s) managed by the hypervisor.

The computing device on which the heterogeneous processing system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
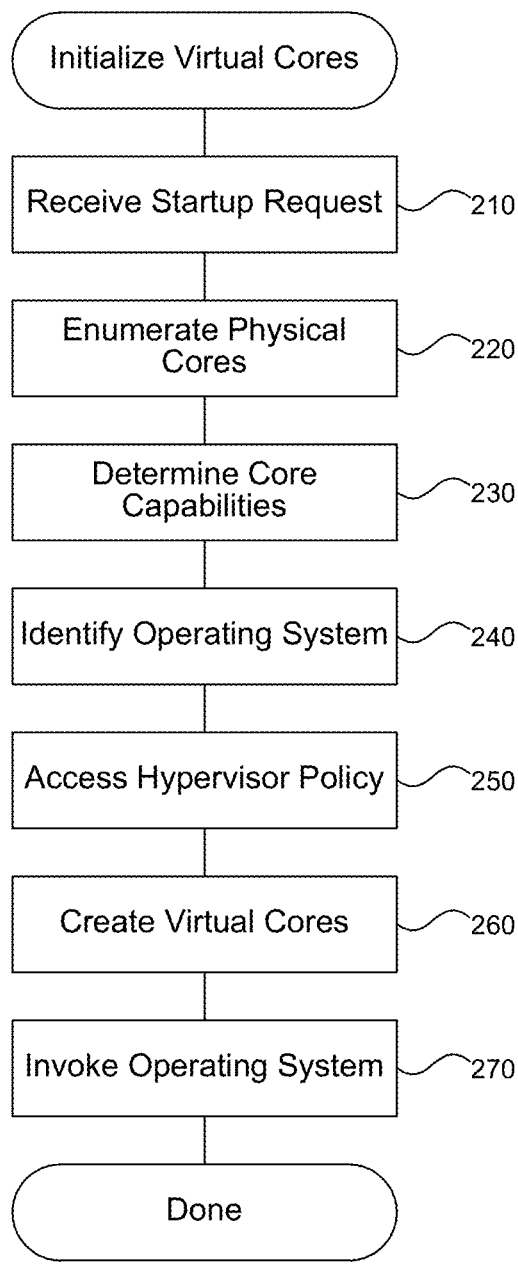
FIG. 2 is a flow diagram that illustrates processing of the heterogeneous processing system to initialize a computing device with heterogeneous processing cores using a hypervisor between the cores and an operating system, in one embodiment.

FIG. 2 is a flow diagram that illustrates processing of the heterogeneous processing system to initialize a computing device with heterogeneous processing cores using a hypervisor between the cores and an operating system, in one embodiment.

Beginning in block 210, the system receives a startup request to initialize a computing device. For example, a basic input/output system (BIOS), extensible firmware interface (EFI), boot loader, or other initial device software may load and invoke a hypervisor that implements the heterogeneous computing system. In some cases, the administrator will have previously performed an installation phase to install the hypervisor on the computing device, although the system can also support network boot and other non-installation scenarios commonly offered for computing devices.

Continuing in block 220, the system enumerates two or more physical processing cores of the computing device. In some embodiments, at least two cores offer different performance and power usage characteristics. However, the system may also be used where asymmetry is not present. For example, using a software hypervisor for power management could still be applicable in scenarios where you have N physical CPUs on die but that only K can be operated based upon externalities such as: ambient temperature, form factor enclosure, cost of available power, etc. At boot, the hypervisor can use this "policy" information to report a virtualized set of K cores to the operating system and this could vary upon each boot cycle. The hypervisor would be performing the same task in this scenario for symmetric cores. The system may invoke the BIOS or other underlying layer to determine how many and what kind of processors the computing device has installed, and may execute a CPUID or other similar instruction to determine information about the processing capabilities of the processors. In some embodiments, the system may include an extensibility interface through which drivers or other hypervisor extensions can be implemented and added by the hypervisor manufacturer or a third party to add support for new processing hardware to the hypervisor, without necessarily updating the hypervisor itself.

Continuing in block 230, the system determines capabilities of each enumerated processing core. The capabilities may include one or more power profiles offered by each core, one or more instruction sets supported by each core, performance characteristics of each core, and so forth. The system may leverage informational interfaces (such as the previously mentioned CPUID instruction) of the core itself or information provided by a driver or other extension to the hypervisor, to determine each core's capabilities. The system uses the determined capabilities to assign threads to each core that are compatible with the core, and to perform scheduling in a manner consistent with received policies and processing goals.

Continuing in block 240, the system identifies one or more operating systems for which the hypervisor will manage access and scheduling for the enumerated physical cores. The system may access a hard drive, flash drive, or other storage of the computing device to determine which operating system to invoke after the hypervisor is initialized. The hypervisor may be designed with information about various operating systems, and may include extensibility so that new operating systems can be supported without updating the hypervisor itself. Each operating system and operating system version may have different scheduling semantics or other nuances that the hypervisor handles to allow the operating system to execute correctly on virtualized processing resources. In some cases, the hypervisor may be requested to allow multiple operating systems to share the enumerated physical processing cores, and policy may dictate how that sharing is handled.

Continuing in block 250, the system accesses hypervisor policy information that specifies one or more goals for scheduling operating system threads on the enumerated physical processing cores. The goals may include performance goals, power usage goals, or other directions for determining which core or cores on which to execute operating system threads. The policy may be stored in a storage device associated with the computing device, hardcoded into a hypervisor implementation, and so forth. The hypervisor may receive updates to the policy through an administrative interface provided to administrators.

Continuing in block 260, the system creates one or more virtual cores to expose to the identified operating system, wherein each virtual core isolates the operating system from determined differences in capabilities among the physical processing cores. For example, the heterogeneous processing system may present two or more big and little cores as a single type of uniform virtual core to the operating system. Upon receiving a scheduling request from the operating system to execute a thread on a virtual core, the system determines which physical core to select for the job based on the accessed hypervisor policy. The hypervisor policy may specify that the hypervisor present a different number of virtual cores than physical cores, such as when it is a goal to be able to seamlessly power down at least some higher power demanding cores in favor of using lower power demanding cores. Alternatively, the system may still power down cores the operating system is aware of but wake up the cores if the operating system chooses to use them or to use a quantity of cores that cannot be satisfied by lower powered cores alone.

Continuing in block 270, the system invokes the identified operating system and presents the created virtual cores to the operating system while isolating the identified operating system from the enumerated physical processing cores. Invoking the operating system may include invoking an operating system loader and presenting the hypervisor in place of the usual BIOS or other layer underlying the operating system. The operating system operates as if it is running directly on the physical hardware, but the hypervisor sits between the operating system and physical hardware to perform the scheduling logic without the operating system's knowledge as described herein. After block 270, these steps conclude.

Figure 3:
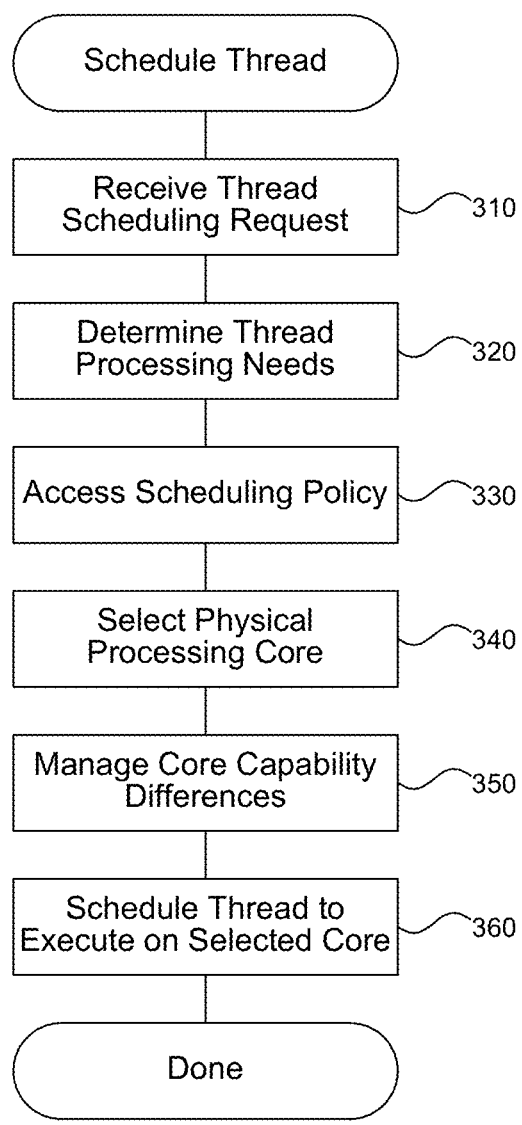
FIG. 3 is a flow diagram that illustrates processing of the heterogeneous processing system to schedule one or more operating system threads through a hypervisor that manages heterogeneous processing cores, in one embodiment.

FIG. 3 is a flow diagram that illustrates processing of the heterogeneous processing system to schedule one or more operating system threads through a hypervisor that manages heterogeneous processing cores, in one embodiment.

Beginning in block 310, the system receives a thread scheduling request from an operating system to run instructions of a thread on an identified virtual core presented by a hypervisor, wherein the virtual core isolates the operating system from one or more capability differences between two or more physical processing cores accessible to a computing device. An operating system typically includes an idle loop for each detected processing core in which the operating system can schedule and place any instructions that the operating system wants to run on that core. The operating system may time slice multiple application threads to run on a particular processing core. Regardless of the particular virtual core that the operating system selects for executing a thread, the hypervisor may select any particular physical processing core to execute the thread in accordance with one or more hypervisor policies.

Continuing in block 320, the system determines the processing needs of the received scheduling request. For example, the system may determine a particular instruction set used by the scheduled thread (e.g., whether one or more instruction set extensions, coprocessors, or other capabilities are being requested), performance requirements of the thread, whether the thread is suitable for slower execution at lower power usage, whether the thread can be delayed until additional processing resources are available, and so forth. The system may use specific knowledge about particular operating systems or instructions received through policy to determine processing needs of a particular thread. For example, the system may identify threads related to the operating system's internal operation, application threads, and so on, and handle each according to policy.

Continuing in block 330, the system accesses a scheduling policy that specifies one or more goals for operating the device. For example, the policy may request optimization of power usage, performance, or a mix of the two. The policy may be stored in a data store associated with the device or hardcoded into particular implementations of the hypervisor. For example, the system may offer a low power usage version of the hypervisor that favors little processing cores until a thread performing a high performance task is scheduled by the operating system. At that point, the system may schedule the high performance task on a big core then direct the big core to sleep after the task is complete.

Continuing in block 340, the system selects a physical processing core on which to execute the thread associated with the received scheduling request, wherein the selection is made based on the accessed scheduling policy. The system may have multiple available cores of differing capabilities and performance/power characteristics on which the system can schedule the thread. Based on the system's choice of core, the computing device will use more or less power and will complete the thread's execution in more or less time. The job or the scheduling policy is to allow the system to make the selection in a manner that promotes one or more goals for managing performance, power, or other characteristics of the computing device. A mobile device may prefer lower power usage, while a high performance server may prefer higher performance. In some cases, policy may differ based on time of day (e.g., peak versus non-peak electricity costs) or other considerations so that the policy varies over time or based on certain conditions.

Continuing in block 350, the system optionally handles any capability differences between the thread and the selected physical processing core. For example, if the thread includes an instruction that is not available on the selected core, the system may emulate the instruction or replace the instruction with one or more equivalent instructions that are supported by the selected core. Managing capability differences adds a significant amount of complexity to the system, and the hypervisor implementer may choose how much or little (if any) differences in capabilities between processing cores any particular implementation will support.

Continuing in block 360, the system schedules the thread to execute on the selected physical processing core. The system also handles any output and provides the output back to the operating system, making the output appear to come from the virtual core to which the operating system assigned the thread. Thus, the operating system is kept unaware of the type and number of cores managed by the hypervisor and uses the set of virtual cores as the operating system normally would in a system without the hypervisor and heterogeneous processing cores. After block 360, these steps conclude.

Figure 4:
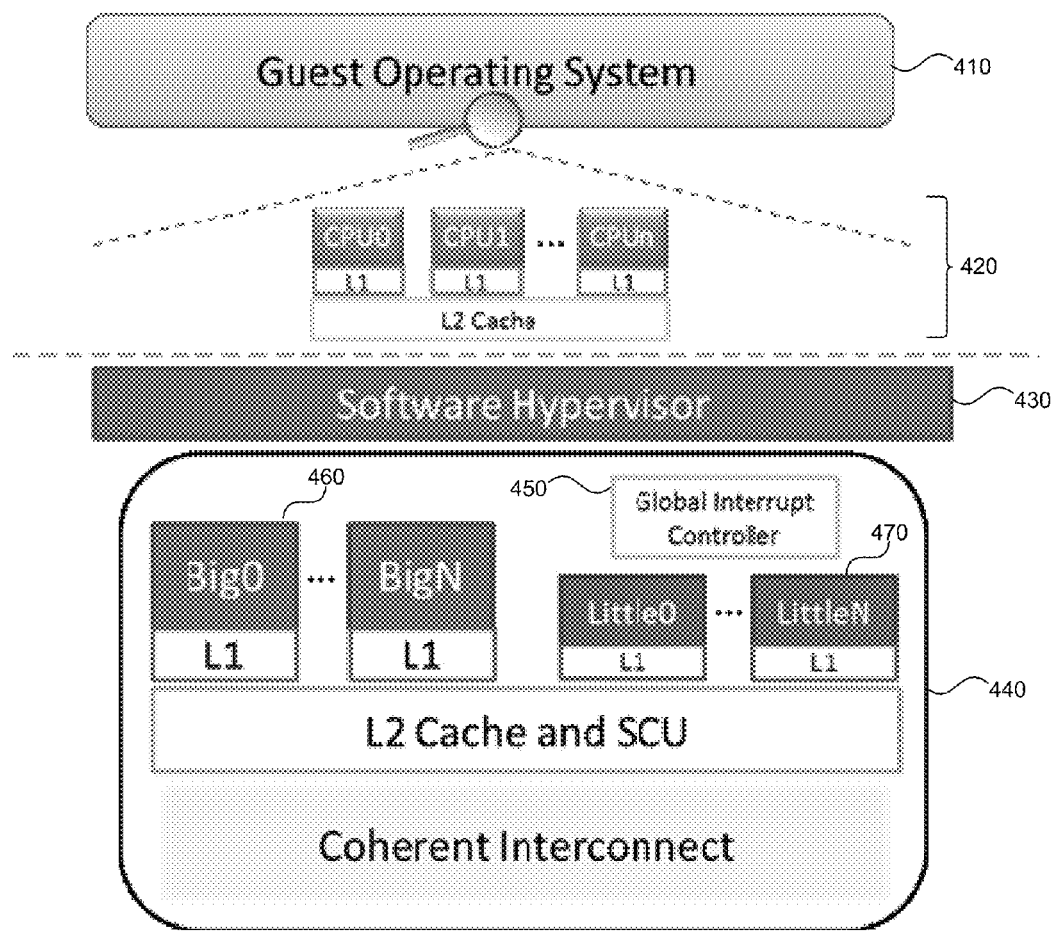
FIG. 4 is a block diagram that illustrates an operating environment of the heterogeneous processing system, in one embodiment.

FIG. 4 is a block diagram that illustrates an operating environment of the heterogeneous processing system, in one embodiment. A guest operating system 410 sees one or more virtual processing cores 420 presented by the software hypervisor 430 that implements the heterogeneous processing system described herein. The software hypervisor 430 manages heterogeneous processing hardware 440 that includes a global interrupt controller 450, one or more big cores 460, and one or more little cores 470. Note that although only two core types are shown (big and little) for ease of illustration, the system can operate with any number of different cores. For example, some processor packages may include several processing stores that gradually step down in power usage and performance. The software hypervisor 430 manages the heterogeneous processing hardware 440 to isolate the guest operating system 410 from any special knowledge or processing needed to use the hardware 440 effectively. Thus, the software hypervisor 430 allows an unmodified legacy operating system, such as guest operating system 410, to leverage newer heterogeneous processing hardware 440. The hypervisor 430 can be modified to keep up with hardware 440 changes, while the operating system 410 continues to operate as normal (although with better and better power/performance characteristics).

In some embodiments, the heterogeneous processing system migrates a thread from one physical processing core to another after the thread is already executed. In some cases, one or more threads may already be executing upon the hypervisor deciding to reduce power consumption, increase performance, or carry out other policy goals. The cores may share cache storage or other facilities, so that the hypervisor can migrate the thread to another core without affecting the thread's access to data. Thus, the hypervisor may interrupt the thread's execution, move the thread's instruction stream to a different physical processing core, and resume execution on the target core.

In some embodiments, the heterogeneous processing system employs processor voltage and frequency modifications to reduce power or increase performance up to a threshold before selecting a different core. For example, the system may start out executing a particular thread on a big core, then scale back the big core's power usage by reducing the core's operating voltage, and finally may migrate the big core's work to a little core. This allows the system to step down power usage gradually to manage a thermal envelope or satisfy other computing goals specified by policy.

In some embodiments, the heterogeneous processing system allows some processing tasks to be migrated to a cloud computing facility. The system can present the cloud computing facility as just another processing core to which tasks can be scheduled. For appropriate tasks, the system may be able to offload the tasks from the computing device entirely and later return the output of the task to the guest operating system. This may allow the system to enter a lower power state on the computing device or to transition work from a datacenter at peak electricity cost to one of lower electricity cost.

In some embodiments, the heterogeneous processing system handles races conditions and employs software-locking paradigms to manage operating system expectations. In many cases, operating system's schedule threads based on interdependencies or lack of dependencies between particular threads. Software may leverage locks, mutexes, semaphores, or other synchronization primitives provided by the operating system to allow the software code to operate correctly in an environment of multiple simultaneously executing threads. The heterogeneous computing system ensures that the operating system's guarantees about thread safety and other synchronization are met, and may introduce additional locks or determine thread scheduling in a manner that ensures no new race conditions or other problems are introduced.

In some embodiments, the heterogeneous processing system includes a hardware hypervisor. Although a software hypervisor has been used in examples herein, those of ordinary skill in the art will recognize that the choice of hardware or software for implementation of computing tasks is often an implementation detail that can be switched to meet performance or other goals. Thus, the system can be implemented with a hardware hypervisor and some processing units may be manufactured to include the system in the processing unit itself.

From the foregoing, it will be appreciated that specific embodiments of the heterogeneous processing system have been described herein for purposes of illustration, but that various modifications may be made without deviating from the spirit and scope of the invention. Accordingly, the invention is not limited except as by the appended claims.

I claim:

1. A computer-implemented method to schedule one or more operating system threads through a hypervisor that manages heterogeneous processing cores, the method comprising:
    presenting an operating system with a set of virtual cores, the set of virtual cores configured by a hypervisor, wherein the virtual cores isolate the operating system from knowing one or more capability differences between physical processing cores accessible to a computing device;
    receiving a thread scheduling request from the operating system to run instructions of a thread on an identified virtual core from the set of virtual cores presented by the hypervisor;
    prior to executing the thread, determining one or more processing needs of the received scheduling request;
    accessing a scheduling policy that specifies one or more goals for operating the computing device, wherein at least one of the goals relates to power usage;
    selecting a physical processing core on which to execute the thread associated with the received scheduling request, wherein the selection is made based on the accessed scheduling policy and available system facilities; and
    scheduling the thread to execute on the selected physical processing core.

2. The method of claim 1 wherein receiving a thread scheduling request comprises regardless of the particular virtual core that the operating system selects for executing a thread, a hypervisor selecting any particular physical processing core to execute the thread in accordance with one or more hypervisor policies.

3. The method of claim 1 wherein determining processing needs comprises determining a particular instruction set, available co-processors, instruction set extensions, or architecture extensions used by the scheduled thread.

4. The method of claim 1 wherein determining processing needs comprises determining one or more performance requirements of the thread.

5. The method of claim 1 wherein determining processing needs comprises determining whether the thread is suitable for slower execution at lower power usage.

6. The method of claim 1 wherein determining processing needs comprises determining, whether the thread can be delayed until additional processing resources are available.

7. The method of claim 1 wherein determining processing needs comprises accessing specific knowledge about a particular operating system to determine processing needs of a particular thread.

8. The method of claim 1 wherein accessing the scheduling policy comprises determining that the policy requests optimization of power usage, and specifies scheduling threads to lower power processing cores that are available.

9. The method of claim 1 wherein accessing the scheduling policy comprises determining that the policy requests optimization of performance and specifies scheduling threads to higher performance processing cores that are available.

10. The method of claim 1 wherein accessing the scheduling policy comprises determining that the computing device is a mobile device with limited power available or a device with thermal limits, and specifies optimizing power usage or managing heat through the selection of cores on which to schedule threads.

11. The method of claim 1 wherein selecting the physical processing core comprises selecting one of multiple available cores of differing capabilities and performance/power characteristics on which the system can schedule the thread.

12. The method of claim 1 wherein selecting the physical processing core comprises making the selection in a manner that promotes one or more goals for managing performance and power usage of the computing device.

13. The method of claim 1 further comprising handling one or more capability differences between the thread and the selected physical processing core.

14. The method of claim 1 wherein scheduling the thread to execute further comprises handling output and providing the output back to the operating system, making the output appear to the operating system to come from the virtual core to which the operating system assigned the thread.

15. A computer system for providing operating system-decoupled heterogeneous computing through a hypervisor, the system comprising:
    one or more processing complexes that include one or more processing cores that have heterogeneous processing capabilities and power profiles;
    an operating system interface component that communicates between a hypervisor and an operating system to receive instructions for delivering to hardware resources and for receiving output from the hardware resources to make differing cores appear the same to the operating system;
    a virtual core management component that manages one or more virtual cores that the hypervisor presents to the operating system, wherein the one or more virtual cores isolate the operating system from knowing one or more capability differences between the processing cores;
    a policy engine component that manages one or more policies for scheduling operating system threads and presenting virtual cores to the operating system based on the available one or more processing complexes, at least one of the policies is based on power usage;

a scheduling component that schedules one or more instruction streams received as threads from the operating system to one or more of the processing complexes installed in the computing device based on a select policy and available system facilities; and a hardware interface component that communicates between the hypervisor and processing complexes to schedule software instructions to run on available physical cores.

16. The system of claim 15 wherein the virtual core management component provides a virtual core that appears to the operating system as a CPU core, but differs in characteristics from available physical hardware to allow the operating system to work with hardware with which the operating system was not designed to work.

17. The system of claim 15 wherein the scheduling component receives a virtual core identification from the operating system that identifies the virtual core to which the operating system requests to schedule the thread.

18. The system of claim 15 wherein the scheduling component examines the schedule request and determines a physical core on which to schedule the thread to execute.

19. The system of claim 15 further comprising a capability management component that manages one or more differences between processing cores.

20. A computer-readable storage device comprising processor-executable instructions that when executed perform actions comprising:

presenting an operating system with a set of virtual cores, the set of virtual cores configured by a hypervisor, wherein the virtual cores isolate the operating system from knowing one or more capability differences between physical processing cores accessible to a computing device;

receiving a thread scheduling request from the operating system to run instructions of a thread on an identified virtual core from the set of virtual cores presented by the hypervisor;

prior to executing the thread, determining one or more processing needs of the received scheduling request;

accessing a scheduling policy that specifies one or more goals for operating the computing device, wherein at least one of the goals relates to power usage;

selecting a physical processing core on which to execute the thread associated with the received scheduling request, wherein the selection is made based on the accessed scheduling policy and available system facilities; and scheduling the thread to execute on the selected physical processing core.

* * * * *